United States Patent

Pfendler et al.

Patent Number: 5,293,215
Date of Patent: Mar. 8, 1994

[54] DEVICE FOR INTERFEROMETRIC DETECTION OF SURFACE STRUCTURES

[75] Inventors: Thomas Pfendler, Gerlingen; Pawel Drabarek, Ditzingen, both of Fed. Rep. of Germany

[73] Assignee: Robert Bosch GmbH, Stuttgart, Fed. Rep. of Germany

[21] Appl. No.: 752,597

[22] PCT Filed: Feb. 1, 1990

[86] PCT No.: PCT/DE90/00066

§ 371 Date: Aug. 13, 1991

§ 102(e) Date: Aug. 13, 1991

[87] PCT Pub. No.: WO90/10195

PCT Pub. Date: Sep. 7, 1990

[30] Foreign Application Priority Data

Feb. 28, 1989 [DE] Fed. Rep. of Germany ....... 3906118

[51] Int. Cl.$^5$ .............................................. G01B 11/24
[52] U.S. Cl. .................... 356/360; 356/349; 356/359; 356/376; 356/445
[58] Field of Search ............... 356/349, 359, 360, 350, 356/358, 376, 445

[56] References Cited

U.S. PATENT DOCUMENTS

| | | | |
|---|---|---|---|
| 4,652,131 | 3/1987 | Fercher et al. | 356/349 |
| 4,681,395 | 7/1987 | Lindsay et al. | 350/96.16 |
| 4,759,627 | 7/1988 | Thylen et al. | 356/345 |
| 4,789,237 | 12/1988 | Inoue et al. | 356/73.1 |
| 4,830,486 | 5/1989 | Goodwin | 356/5 |

OTHER PUBLICATIONS

Thierry Gys "A Simple Multimode Fiberoptic Vibrometer", Nov. 1985, pp. 79-82.
A. F. Fercher, H. Z. Hu. & U. Vry, "Rough Surface interferometer with a two-wave length heterodyne speckle interferometry", Jul. 1985, No. 14 pp. 2181-2188.
I. A. Massie, R. D. Nelson, & S. Holly, "High-Performance real-time heterodyne interferometry", Jun. 1, 1979, vol. 18, No. 11, pp. 1797-1803.
K. Leonhardt, K. -H. Rippert & H. J. Tiziani "Optische mikroprofilometrie und Rauheitsmessung".
"Optical microprofilometry and roughness measurement", 1987, No. 6, pp. 243-252.

Primary Examiner—Samuel A. Turner
Assistant Examiner—LaCharles Keesee
Attorney, Agent, or Firm—Frishauf, Holtz, Goodman & Woodward

[57] ABSTRACT

A device for interferometric detection of surface structures by measurement of the phase difference in laser speckle pairs in the measuring points of this surface is proposed. This device comprises at least two laser sources (10-12), the frequency or wavelength of which is modulated, a splitter device (16) splitting the respectively generated laser beam into two partial beams, means for frequency shifting of the two partial beams in relation to each other, and a beam guide device, by means of which one of the partial beams can be supplied as a reference beam and the other as a measuring beam, guided to the measuring point and reflected there, both interferometrically superimposed, to a photodetector device (25), downstream of which an evaluating device (27) for determining the phase shift is placed. The splitter device is connected on the input side with at least two laser sources (10-12) via an optical fiber line (13-15), and the two partial beams emanating from the splitter device (16) also pass at least for a partial distance through the optical fiber lines (17 and 18) and one of these fiber lines (17) has a lengthening (19) in respect to the other. In this way, it is possible to generate a measuring beam and a reference beam with slight frequency differences in a simple and cost-saving manner, where a compact structure is possible with the least adjustment efforts is possible.

6 Claims, 2 Drawing Sheets

DEVICE FOR INTERFEROMETRIC DETECTION OF SURFACE STRUCTURES

FIELD OF THE INVENTION

The invention relates to a device for interferometric detection of surface structures by measurement of the phase difference in laser speckle pairs in the measuring points of this surface.

BACKGROUND

Such a device and a corresponding method are extensively described in U.S. Pat. No. 4,652,131, FERCHER/CARL ZEISS, and corresponding German Published, Non-Examined Patent Application DE-OS 33 18 678 or in the reference book "Laser Speckle". J. C. Dainty, Springer Verlag, Berlin, Heidelberg, New York, 1975. In the known device, the light emitted by a laser is split into a reference and a measuring beam, and a device shifts the frequency of the reference beam. The measuring beam is reflected on the rough surface which is to be measured and is then shown in the interferogram plane, together with the reference beam. With rough surfaces of this kind, a speckle pattern is obtained in the interferogram plane, instead of the customary interferogram. It is then possible to draw interferences as to the geometric shape of the rough surface by determining the phase difference such as described in more detail in the aforementioned prior art.

A complicated optical system with lenses, mirrors and prisms, as well as a frequency converter, not further described, is used for generating the different wavelengths or frequencies of the two beams. However, not only is such a system complicated and expensive to manufacture, but also hard to adjust to the required exactness. Furthermore, this arrangement requires such a large space that it is hard to contain it in a small and handy device.

Advantages of the Invention

In contrast to this, the device in accordance with the invention has the advantage that it is possible to use a very simple arrangement of optical fiber-conduits for beam splitting and frequency conversion. Optical couplers and splitters for such fiber conduits are available in the form of common components. Because of this, beam guidance is variable and does not need any adjustment, at least in this area. Frequency shifting is achieved by a predetermined lengthening of a fiber line and frequency modulation or wave length modulation, because of which the "frequency converter" becomes very simple and cost-saving. Since the fiber lines can be placed very closely next to each other without any exactness being required, the entire arrangement not only becomes very cost-saving, but also very compact.

A particular problem in measuring consists in that, with the known methods, the height differences to be measured on the measured surface must be less than one-half of a wavelength of the measuring beam. Height differences which are one-half of a wavelength apart result in the the same signal, namely a phase difference of 360°. To meet this problem, it is necessary with the known measuring devices to select the wavelength of the measuring beam appropriately, i.e. certain prior information or estimates regarding the roughness and structure of the surface to be measured are required. This problem recedes into the background when a plurality of coupled laser sources with different wavelengths is employed. The phase differences are determined in a known shape from the interferometrically superimposed signals separately from each laser source in the evaluation device and subsequently a comparison of the different phase differences detected is performed. In the course of subtraction, clear differences now appear in regard to whether the differences in the height structure are less than half a wavelength or whole number multiples. Adaptation of the wavelength to the appropriate surface to be measured is no longer necessary within a wide margin, so that it is also possible to examine very different surfaces with the same measuring device without special setting.

A simple structural embodiment is achieved in that the splitter device is provided with an optical coupler for the at least two optical fiber lines on the input side.

The wavelengths of the different laser sources differ only slightly. The exactness of the result increases with a larger number of laser sources.

A structural embodiment consists in that all laser sources operate simultaneously and that a number of photodetectors corresponding to the number of laser sources are provided in the photodetector device, where means for splitting the laser beam into its components with different wavelengths and for supplying them to the individual photodetectors are provided in front of these photodetectors. The laser sources can be very simply controlled in this simultaneous operation and a simple evaluation is possible because of the simultaneous availability of the measurement results. However, in this case a plurality of photo-detectors as well as a device for splitting the laser beam is required. Otherwise the laser sources could also operate sequentially, so that only a single photodetector would be required in the photodetector device. For evaluation, a memory device for the intermediate storage of the measurement results is required here, and the laser sources must be sequentially controlled.

DRAWINGS

Two exemplary embodiments of the invention are shown in the drawings and will be described in detail in the following description. Shown are in:

FIG. 1 a schematic illustration of the measurement assembly for sequential operation, and FIG. 2 a detailed view of the measurement assembly for simultaneous operation of the laser sources.

DETAILED DESCRIPTION

Figure 1:
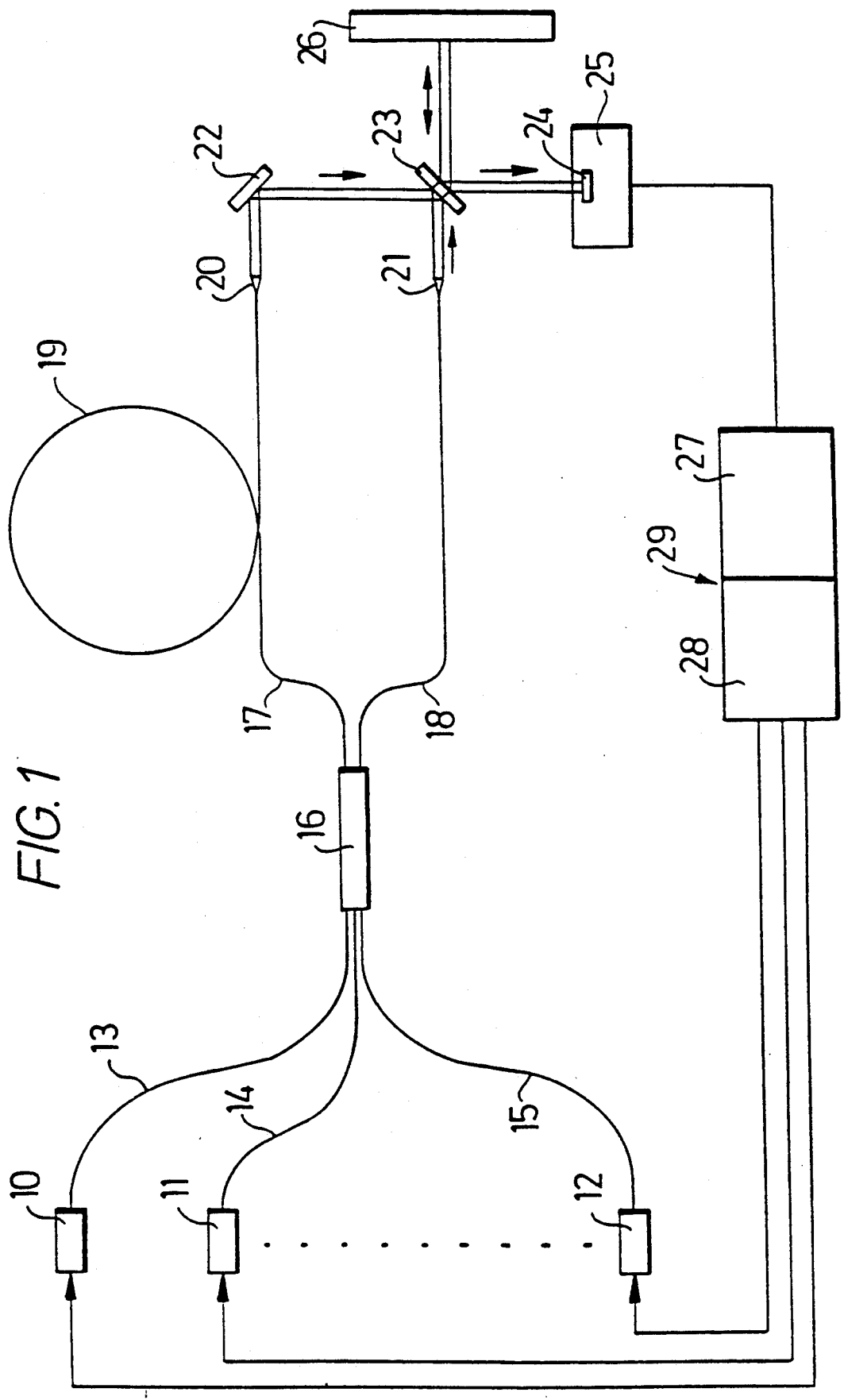

Three laser sources 10 to 12 in the form of laser diodes are provided in the first exemplary embodiment shown in FIG. 1, the frequency of which is modulated by means of current modulation, in particular injection current modulation. The dotted line between the laser sources 11 and 12 is intended to indicate that the number of laser sources may also be higher. However, at least two laser diodes must be provided. The laser beams emitted by these laser diodes are each routed to a coupling and splitter device 16 via optical fiber lines 13 to 15, where they are first coupled into a single beam and subsequently are split again into two identical output beams, namely a reference and a measuring beam. The reference beam continues on in an optical fiber line 17 and the measuring beam in an optical fiber line 18. The optical fiber line 17 has a loop 19 for the reference beam, which lengthens this fiber line 17 in respect to the fiber line 18 by the length of this loop 19.

Because of the frequency modulation and the passage through the various optical paths, a relative frequency difference in respect to the measuring beam is created in the reference beam, which percentage-wise is very small in view of the customary frequencies of laser light and which may be some kHz, for example.

The reference and measuring beams leave the fiber lines 17, 18 by their ends, are collimated and guided to a deflection device, consisting of a mirror 22 inclined at an angle of 45° and a beam splitter 23, which is oppositely inclined at an angle of 45°. The reference beam exiting from the end 20 is deflected at right angles at the mirror 22, passes through the beam splitter 23 and arrives at a photodetector 24, in the form of a photodiode, of a photodetector device 25. The measuring beam passes from the end 21 through the beam splitter 23 to the surface to be measured of an object 26, is reflected there and is also guided to the photodetector 24 by the beam splitter 23. The two components are superimposed in accordance with the interferometer principle and in this way illuminate the photodetector unit.

The signal received by the photodetector unit 24 is processed in the photodetector device 25, as required, and forwarded to an evaluation device 27 which, together with a frequency modulator 28, forms the electronic control and evaluation device 29. The laser sources 10 to 12 can be current-modulated, in particular injection current-modulated, for changing of their frequency or wavelength by the frequency modulator 28, and switched on sequentially in set time frames.

The measuring device shown in FIG. 1 works in the so-called monocolor operation, i.e. the laser sources 10 to 12 are switched on sequentially in the respective time frame so that there always is laser light of only one wavelength. This laser light of one wavelength is split—as already described—into a measuring beam and a reference beam in the coupling and splitter device 16. Because of frequency modulation and passage through the loop 19, the reference beam undergoes a relative frequency shift of, for example, a few kHz in relation to the measuring beam. This reference beam and the measuring beam, reflected on the surface of the object 26, are superimposed in accordance with the interferometer principle and illuminate the photodetector 24, the measurement signal of which thus also has a frequency of, for example, a few kHz, which corresponds to the frequency difference between the measuring and the reference beam.

A phase difference is thus created in accordance with the unevenness and height differences on the surface of the object 26, which depends on these height differences. This is described in detail in the aforementiond prior art. For example, a profile change corresponding to one-half of a wavelength results in a measurement signal shift of 360°.

Subsequently the other laser sources 11 and 12, each one of which has a wavelength increased, for example, by 10%, are now switched on one after the other. This would correspondingly result in phase shifts of the measuring signal of 324° and 298°. Thus phase difference angles of 36° and 72° are detected by subtraction. If, on the other hand, the height differences on the object 26 would be a whole wavelength of the laser light of the first laser source 10, phase difference angles of 72° and 144° would result. Exact measurements of surface structures are possible in this way, the height differences of which are multiples of half a wavelength.

Figure 2:
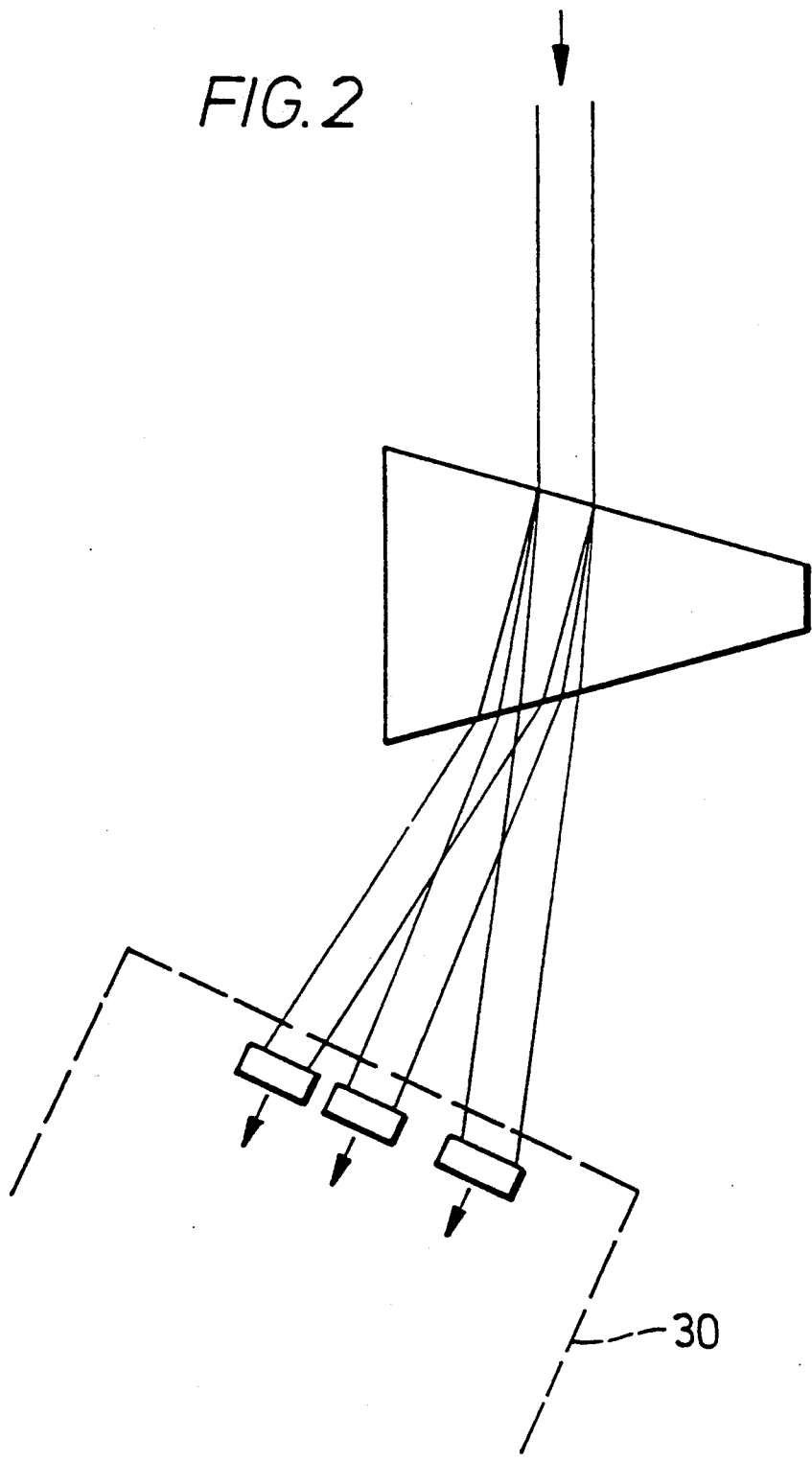

The second exemplary embodiment partially shown in FIG. 2 to a large degree corresponds to the first exemplary embodiment. The photodetector device 30 merely takes the place of the photodetector device 25, which has a number of photodetectors 31 to 33 corresponding to the number of laser sources; they are three in the exemplary embodiment shown. In this exemplary embodiment, all three laser sources 10 to 12 operate simultaneously, and the correspondingly superimposed laser beams of three different wavelengths are split into their individual components with different wavelengths by a prism 34 or some other wavelength splitter, for example a diffraction grid, slightly in front of the photodetector device 30. Evaluation in this case can be simultaneous, since all three measurement values are simultaneously available, while in connection with the first exemplary embodiment an intermediate memory was required before it was possible to determine the phase differences. The mode of operation on which FIG. 2 is based can also be called multicolor operation.

We claim:

1. A device for interferometric detection of surface structures, comprising
   at least two laser sources (10-12) for generating at least two laser beams (13-15) of different respective wavelengths,
   a coupler/splitter device (16), coupled to respective outputs of said laser sources, for combining said at least two laser beams into a combined beam and splitting said combined beam into two partial beams,
   means for shifting frequency of one of said two partial beams with respect to the other of said beams, one of the partial beams serving as a reference beam and the other serving as a measuring beam, said measuring beam being guided to a measuring point on an object (26) whose surface is to be measured and reflected there, said referenced beam and said measuring beam being interferometrically superimposed at a photodetector (25),
   and an evaluating device (27) connected to an output of said photodetector device for detecting at least one phase shift,
   wherein
   more than one laser source (10, 11, 12) is provided;
   at least one modulation means (28) is provided, modulating at least one of laser pumping current of each laser source and laser frequency of said laser sources (10, 11, 12);
   the respective outputs of said laser sources are coupled to the input of the coupler/slitter device (16) using optical fibers (13, 14, 15); said two partial beams leaving the coupler/splitter device (16) pass through respective optical fibers (17, 18) for at least a portion of a distance to said photodetector (25);
   and said means for shifting frequency includes a lengthening (19) in one (17) of said partial beam optical fibers (17, 18) with respect to the other (18) fiber;
   and wherein
   the laser sources (10, 11, 12) operate sequentially; only a single photodetector (24) is provided in the photodetector device (25), and
   the phase difference is determined in the evaluation device (27) from the interferometrically superimposed signals from each laser source (10, 11, 12), in the course of which a comparison of different phase differences is performed.

2. A device in accordance with claim 1, wherein the coupler/splitter device (16) is provided with an optical coupler for at least two optical fiber lines (13 to 15) at the input side of said coupler/splitter device.

3. A device for interferometric detection of surface structures, comprising
- at least two laser sources (10-12) for generating at least two laser beams (13-15) of different respective wavelengths,
- a coupler/splitter device (16), coupled to respective outputs of said laser sources, for combining said at least two laser beams into a combined beam and splitting said combined beam into two partial beams,
- means for shifting frequency of one of said two partial beams with respect to the other of said beams, one of the partial beams serving as a reference beam and the other serving as a measuring beam, said measuring beam being guided to a measuring point on an object (26) whose surface is to be measured and reflected there, said referenced beam and said measuring beam being interferometrically superimposed at a photodetector (25),
- and an evaluating device (27) connected to an output of said photodetector device for detecting at least one phase shift, wherein
more than one laser source (10, 11, 12) is provided;
at least one modulation means (28) is provided, modulating at least one of laser pumping current of each laser source and laser frequency of said laser sources (10, 11, 12);
the respective outputs of said laser sources are coupled to the input of the coupler/slitter device (16) using optical fibers (13, 14, 15); said two partial beams leaving the coupler/splitter device (16) pass through respective optical fibers (17, 18) for at least a portion of a distance to said photodetector (25);
and said means for shifting frequency includes a lengthening (19) in one (17) of said partial beam optical fibers (17, 18) with respect to the other (18) fiber;
and wherein
the laser sources (10-12) operate simultaneously;
a number of photodetectors (31-33), corresponding to the number of laser sources (10-12), is provided in the photodetector device (30), and
in front of these photodetectors (31-33), means (34) are provided for splitting the laser beam into its components with different wavelengths and for supplying the individual photodetectors (31-33).

4. A device in accordance with claim 3, wherein a prism is provided at means (34) for splitting.

5. A device in accordance with claim 3, wherein a diffraction grid is provided as means (34) for splitting.

6. A device in accordance with claim 4, wherein the laser sources (10-12) operate sequentially and only a single photodetector (24) is provided in the photodetector device (25).

* * * * *